United States Patent [19]

Tanaka et al.

[11] Patent Number: 4,965,460
[45] Date of Patent: Oct. 23, 1990

[54] ANTI-THEFT SYSTEM FOR A VEHICLE

[75] Inventors: Akira Tanaka, Saitama; Masaaki Fukamachi; Kazuhiro Sakata, both of Miyazaki, all of Japan

[73] Assignees: Honda Giken Kogyo Kabushiki Kaisha; Kabushiki Kaisha Honda Lock, both of Japan

[21] Appl. No.: 236,063

[22] Filed: Aug. 24, 1988

[30] Foreign Application Priority Data

| Aug. 25, 1987 | [JP] | Japan | 62-210553 |
| Aug. 25, 1987 | [JP] | Japan | 62-210549 |
| Aug. 25, 1987 | [JP] | Japan | 62-210552 |
| Aug. 25, 1987 | [JP] | Japan | 62-210544 |
| Aug. 25, 1987 | [JP] | Japan | 62-210554 |
| Aug. 25, 1987 | [JP] | Japan | 62-210555 |
| Aug. 25, 1987 | [JP] | Japan | 62-210556 |
| Aug. 25, 1987 | [JP] | Japan | 62-210557 |

[51] Int. Cl.$^5$ .................... B60R 25/04; B62D 45/00
[52] U.S. Cl. .................... 307/10.2; 307/10.3; 307/10.4; 340/543; 180/287
[58] Field of Search ............. 307/10 AT, 10.2, 10.3, 307/10.4; 340/64, 542, 543, 573, 576; 180/287

[56] References Cited

U.S. PATENT DOCUMENTS

| 4,107,962 | 8/1978 | MacKinnon | 307/10.2 X |
| 4,347,545 | 8/1982 | Weishaupt et al. | 307/10 AT X |
| 4,438,426 | 3/1984 | Adkins | 307/10 AT X |
| 4,594,505 | 6/1986 | Sugimoto | 307/10 AT X |
| 4,697,171 | 9/1987 | Suh | 307/10 AT X |
| 4,738,334 | 4/1988 | Weishaupt | 307/10 AT X |
| 4,794,268 | 12/1988 | Nakano et al. | 307/10.2 |
| 4,835,407 | 5/1989 | Kataoka et al. | 307/10.2 X |

FOREIGN PATENT DOCUMENTS 5790237 11/1980 Japan .

Primary Examiner—William M. Shoop, Jr.
Assistant Examiner—Sharon D. Logan
Attorney, Agent, or Firm—Skjerven, Morrill, MacPherson, Franklin & Friel

[57] ABSTRACT

A vehicular anti-theft system, comprising: a mechanical key switch which can be turned with a matching mechanical key between a first angular position suitable for receiving the mechanical key therein and corresponding to an inoperative state of the vehicle and a second angular position corresponding to an operative state of the vehicle; electronic code matching circuit for detecting an electronic code signal transmitted from a transmitter incorporated in a part of the mechanical key; a control circuit which enables the vehicle when the mechanical key switch is turned with a matching key to the second angular position and the electronic code matching circuit has detected the matching code signal from the transmitter; a trigger circuit which acts upon the control circuit into detecting the matching code signal transmitted from the transmitter; wherein the trigger circuit is activated when the angular position of the mechanical key switch is set to a certain position preceding the position for starting the vehicle. Thereby, the process of code matching is performed before the ignition key switch is turned to the position for starting the vehicle, and the time required to start the vehicle is not increased by this code matching process.

15 Claims, 8 Drawing Sheets

ANTI-THEFT SYSTEM FOR A VEHICLE

TECHNICAL FIELD

The present invention relates to an anti-theft system for a vehicle, and in particular to such a system which prevents the theft of the vehicle itself by preventing the unauthorized entry into the vehicle or the unauthorized starting of the engine.

BACKGROUND OF THE INVENTION

Conventionally, theft of vehicles has been prevented by using an ignition key switch adapted for a mechanical cylinder lock. However, since a mechanical key can be duplicated without much difficulty, such a precaution has not always been successful. Japanese Patent Laid-Open Publication No. 57-90237 discloses a vehicular anti-theft system in which starting of the engine is made possible only when a signal containing a code unique to the vehicle is transmitted from a portable transmitter to a receiver mounted on the vehicle after an ignition switch has been closed by inserting a mechanical key into the ignition key switch, and the receiver permits the starting of the engine according to the result of verification of the code. According to this proposal, a duplicated mechanical key cannot start the engine and the theft of the vehicle is positively prevented. However, this patent publication merely suggested the use of a transmitter as means of a double security measure without any specific disclosure as to the physical structure of the system. On the other hand, U.S. Pat. application No. 121,321 assigned to one of the assignees of the present application discloses a similar device which combines an electronic ignition key system and a remote controller for a door lock into a single body.

However, these previously proposed systems have the shortcoming that a series of complicated steps, including the closure of the key switch for starting the engine, transmitting of the signal from the transmitter to the receiver on the vehicle, and the actual starting of the engine, are required. Thus, a certain time delay is inevitable between the time the key switch is turned on and the time the engine is actually started.

Further, in such systems, the transmitter and the receiver typically consist of a light emitting diode and a photodiode, respectively, and an optical pulse code signal is directed from the transmitter to the receiver which is provided, for instance, adjacent to the door handle of the vehicle or the key cylinder of the steering lock. When such a transmitter is used for starting the engine, the duration of the code signal is desired to be as short as possible in order to eliminate any time lag before the engine is actually started. However, when the transmitter is used to unlock or lock the door, the duration of the code signal is desired to be sufficiently long because the user holding the transmitter must aim it at the receiver and may have a substantial difficulty in doing so if the duration of the signal is too short. When starting the engine, however, the transmitter which is accommodated in the handle of the engine key is automatically aligned with the receiver as the ignition key is inserted into the key hole of the ignition switch.

Additionally, if the transmitter is to be used for both as an electronic ignition key system and a remote controller for a door lock, it must be provided with an internal battery and the battery must be electrically charged to a sufficient level at all time for its satisfactory operation. This is particularly important when the transmitter is to be accommodated in the small space of the key handle. By electrically charging the internal battery while the key is inserted in the key hole of the ignition system by establishing an electric contact therebetween, this problem can be solved. But, if the transmission of the signal is continuously performed between the transmitter and the receiver throughout the time in which the power source of the portable unit is electrically charged, the electrical charging of the power source of the transmitter may become insufficient.

According to conventional mechanical key ignition systems, if the owner of the vehicle either has lost or damaged the mechanical key, he can readily duplicate the key without any substantial inconvenience. However, according to the electronic anti-theft system, if he has lost the transmitter or the transmitter has failed to be able to function properly, a considerable inconvenience is caused to him because it takes a considerable time period before another transmitter capable of transmitting the unique code signal becomes available to him, and he cannot operate the vehicle during this time period.

BRIEF SUMMARY OF THE INVENTION

In view of such problems of the prior art, a primary object of the present invention is to provide a vehicular anti-theft system which can positively prevent the theft of the vehicle without in any way complicating the procedure for starting the engine or the operation of the vehicle.

A second object of the present invention is to provide a reliable vehicular anti-theft system which does not increase the time period required to start the vehicle as compared to the conventional mechanical ignition key switch systems.

A third object of the present invention is to provide a reliable vehicular anti-theft system which is used in connection with a control unit which permits the engine to be started by verifying an electronic code, and eliminates the need for verifying the code all over again after the engine has been started.

A fourth object of the present invention is to provide an improved remote control system which can generate signals in an efficient manner as a result of giving a consideration to the conditions of the operation.

A fifth object of the present invention is to provide an anti-theft system which assures a reliable electrical charging of the power source of the transmitter, and can favorably operate at all times.

According to the present invention, such objects are accomplished by providing a vehicular anti-theft system, comprising: a mechanical key switch which can be turned with a matching mechanical key between a first angular position suitable for receiving said mechanical key therein and corresponding to an inoperative state of the vehicle, and a second angular position corresponding to an operative state of said vehicle; electronic code matching means for detecting an electronic code signal transmitted from a transmitter incorporated in a part of said mechanical key; control means which enables said vehicle when said mechanical key switch is turned with a matching key to said second angular position and said electronic code matching means has detected said matching code signal from said transmitter; trigger means which acts upon said control means into detecting said matching code signal transmitted from said transmitter; wherein said trigger means is activated when the angular position of said mechanical key switch is between a third angular position, which is between said first angular position and said second angular position, and a fourth angular position, which is between said third angular position and said second angular position. If desired, two or more of these angular positions may coincide one another.

Thereby, the time required to start the engine of the vehicle which involves the verification of the electronic code can be reduced, and the prevention of the theft of the vehicle can thus be accomplished without complicating the operation of the vehicle. The trigger means may be activated by other means. For instance, a wireless signal transmitting means may be provided to the side of the vehicle while the transmitter is provided with a corresponding signal receiving means so that the trigger means may activate the transmitter when its signal receiving means has received a certain signal from the signal transmitting means of the vehicle.

According to a certain aspect of the present invention, this can be favorably realized by providing said mechanical key switch and said mechanical key with contact means which establish an electric contact therebetween when said mechanical key is inserted into said mechanical key switch at said first angular position, said trigger means being activated when said electric contact is established. Alternatively, said mechanical key switch and said mechanical key are provided with contact means which establish an electric contact therebetween when said mechanical key switch is located between said third and fourth angular positions, said trigger means being activated when said electric contact is established.

According to another aspect of the present invention, said control means is provided with memory means which keeps said vehicle enabled once it is enabled without requiring the process of detecting said matching electronic code signal by said code matching means all over again even when the vehicle is to be restarted, as long as said mechanical key is kept inserted in said mechanical key switch after said code matching means has detected said matching electronic code. alternatively, the memory means may be kept active as long as said mechanical key switch is kept within a certain range of its angular position after said code matching means has detected said matching electronic code.

Thus, by adding the memory means to the control circuit which permits the engine to be started without requiring the code matching process to be performed all over again, the operation of the engine can be continued without fail once the electronic code has been verified and the engine has been started. Also, if the initial code matching process has been successful, the memory keeps the vehicle in its operative state even when the transmitter is deactivated; thus, the process of code verification is required only in the initial stage of starting the vehicle and the transmitter may be deactivated immediately after the successful code verification has been detected or when the vehicle has been started.

According to yet another aspect of the present invention, the vehicular anti-theft system is provided with a self retaining circuit which retains the enabled state of the vehicle once a successful code matching has taken place. Thereby, the transmitter may be deactivated after the vehicle has been started. Also, even when the vehicle control system is temporarily interrupted or disturbed due to external interferences or internal failures, the vehicle can continue its operation.

According to yet another aspect of the present invention, there is provided a vehicular anti-theft system, comprising: a mechanical key switch which can be turned with a matching mechanical key between a first angular position suitable for receiving said mechanical key therein and corresponding to an inoperative state of the vehicle, and a second angular position corresponding to an operative state of said vehicle; electronic code matching means for receiving an electronic code signal from a transmitter incorporated in a part of said mechanical key; control means which enables said vehicle when said mechanical key switch is turned with a matching key to said second angular position but disables said vehicle when said electronic code matching means fails to receive a matching code signal from said transmitter after said vehicle has been enabled.

Thus, the delay due to the process of code matching in starting the vehicle is prevented in this way also. And, even the theft of the vehicle through direct connection of the electric power line to the ignition system and the starter motor of the vehicle can be prevented without complicating the procedure for starting the engine. In particular, when the present invention is applied to a lock device which involves the verification of both a mechanical key and an electronic code, an even more reliable theft prevention can be effected.

According to yet another aspect of the present invention, said transmitter is provided with a manual switch which acts upon said transmitter into activating certain on-board equipment, said transmitter producing two distinct code signals depending on whether said transmitter is activated by said trigger means or by said manual switch. According to a preferred embodiment of the present invention, said on-board equipment is a vehicle door lock device, and the code signal for activating said vehicle door lock is longer in time duration than the code signal for enabling said vehicle.

Thus, an appropriate pulse code signal is selected depending on the circumstance; thereby, the engine can be started without any substantial time delay while the door lock can be readily locked and unlocked even when the transmitter is not exactly aimed at the receiver.

According to a certain embodiment of the present invention, said mechanical key is provided with a rechargeable battery for supplying electric power to said transmitter, a manual switch for activating said transmitter, and contact means connected to said rechargeable battery, while said mechanical key switch is provided with corresponding contact means which establishes an electric contact with said contact means of said mechanical key when said mechanical key is inserted into said mechanical key switch, said control means disabling the activation of said transmitter by means of said manual switch when said rechargeable battery receives electric power via said contact means.

Thus, the electric power source of the transmitter is not wasted by any unintended operation of the manual switch.

According to yet another aspect of the present invention, the vehicular anti-theft system further comprises keyboard means for manually entering a code therefrom into said control means, the entering of said code acts upon said control means into enabling said vehicle only by turning said mechanical key switch with said matching mechanical key to said second angular position.

Preferably, in order to improve the security of the electronic code, the vehicle may be enabled by entering of said code from said keyboard means only when said mechanical key switch is turned with said matching mechanical key to said second angular position at a certain chronological relation with the time point at which said code is entered from said keyboard means.

Thus, since the electronic code can be inputted to the vehicle even when the transmitter have become inoperable or unavailable, the convenience of the anti-theft system is improved without impairing the performance of the system.

BRIEF DESCRIPTION OF THE DRAWINGS

Now the present invention is described in the following in terms of specific embodiments with reference to the appended drawings, in which.

DETAILED DESCRIPTION OF THE PREFERRED EMBODIMENTS

Figure 1:
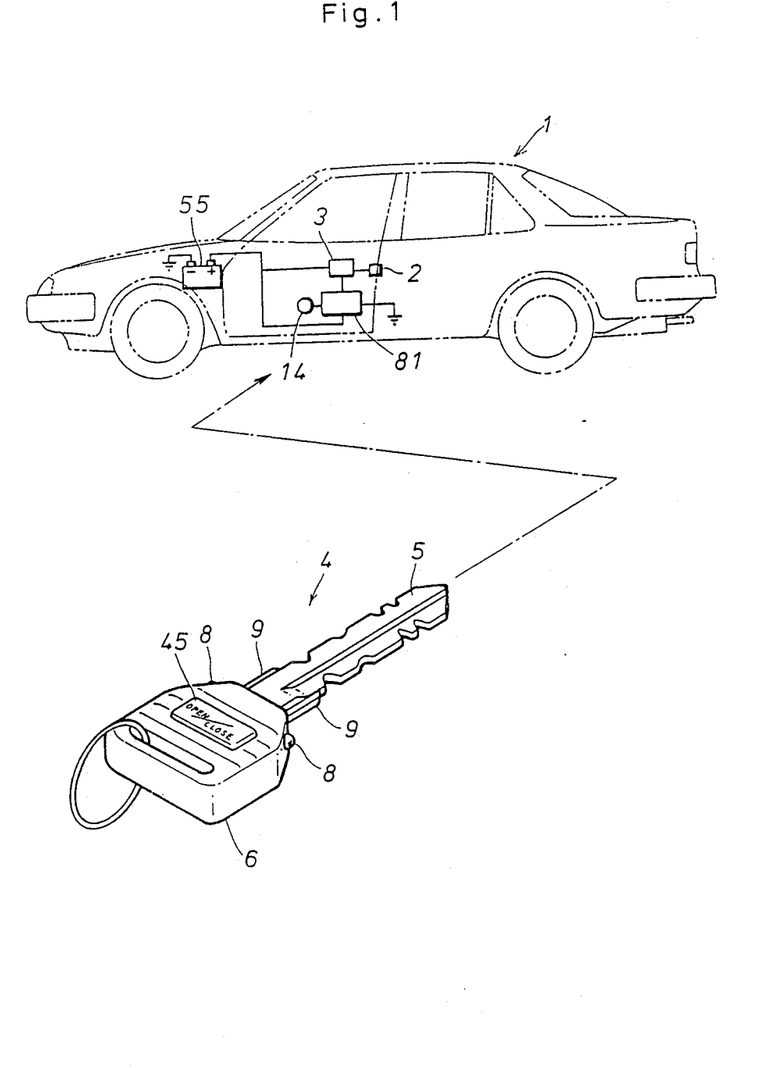
FIG. 1 is a schematic overall view of the anti-theft system according to the present invention.
Figures 2, 4:
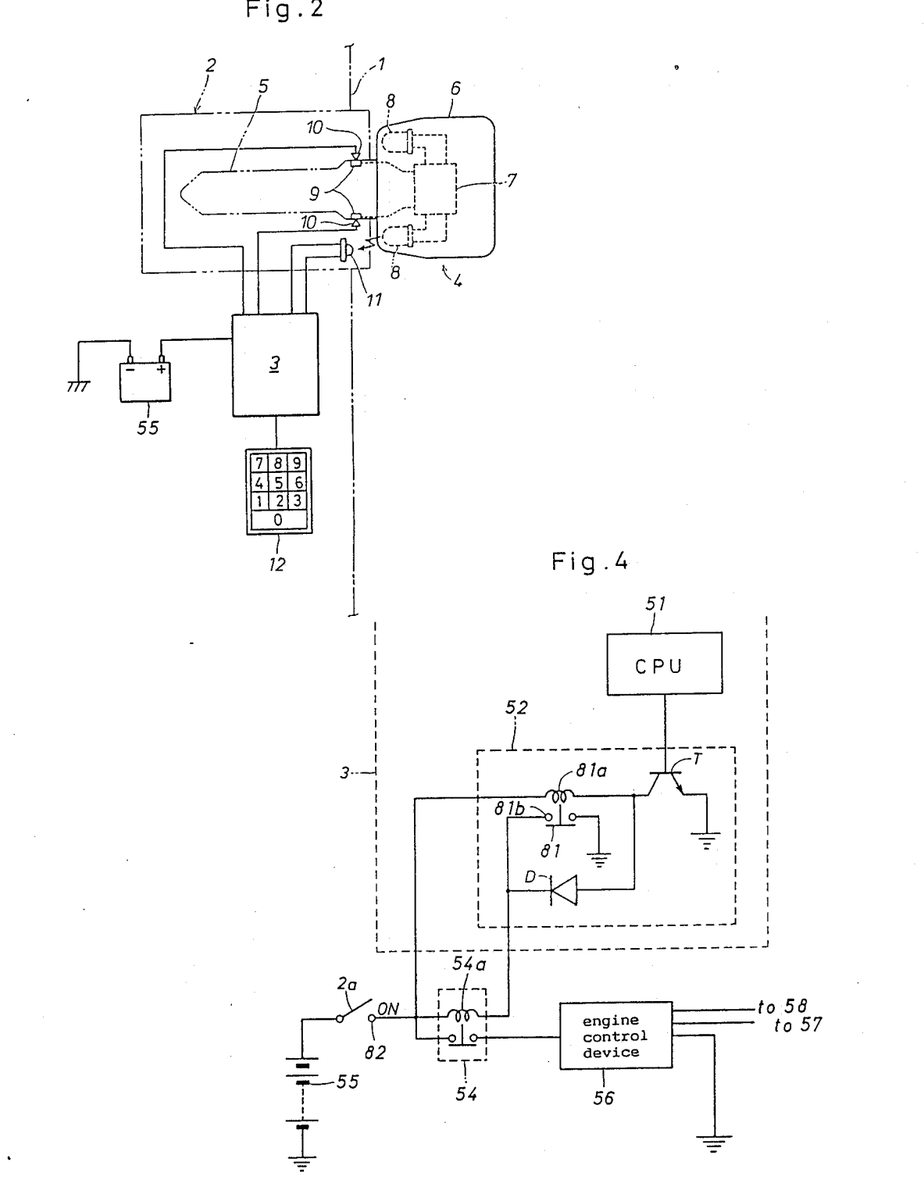
FIG. 2 is an illustrative view of essential parts of the key device and the key switch unit of the vehicular anti-theft system according to the present invention when the key device is inserted into the key switch.
FIG. 4 is a diagram of an embodiment of the self retaining circuit which may be incorporated in the system illustrated in FIG. 3.
Figure 3:
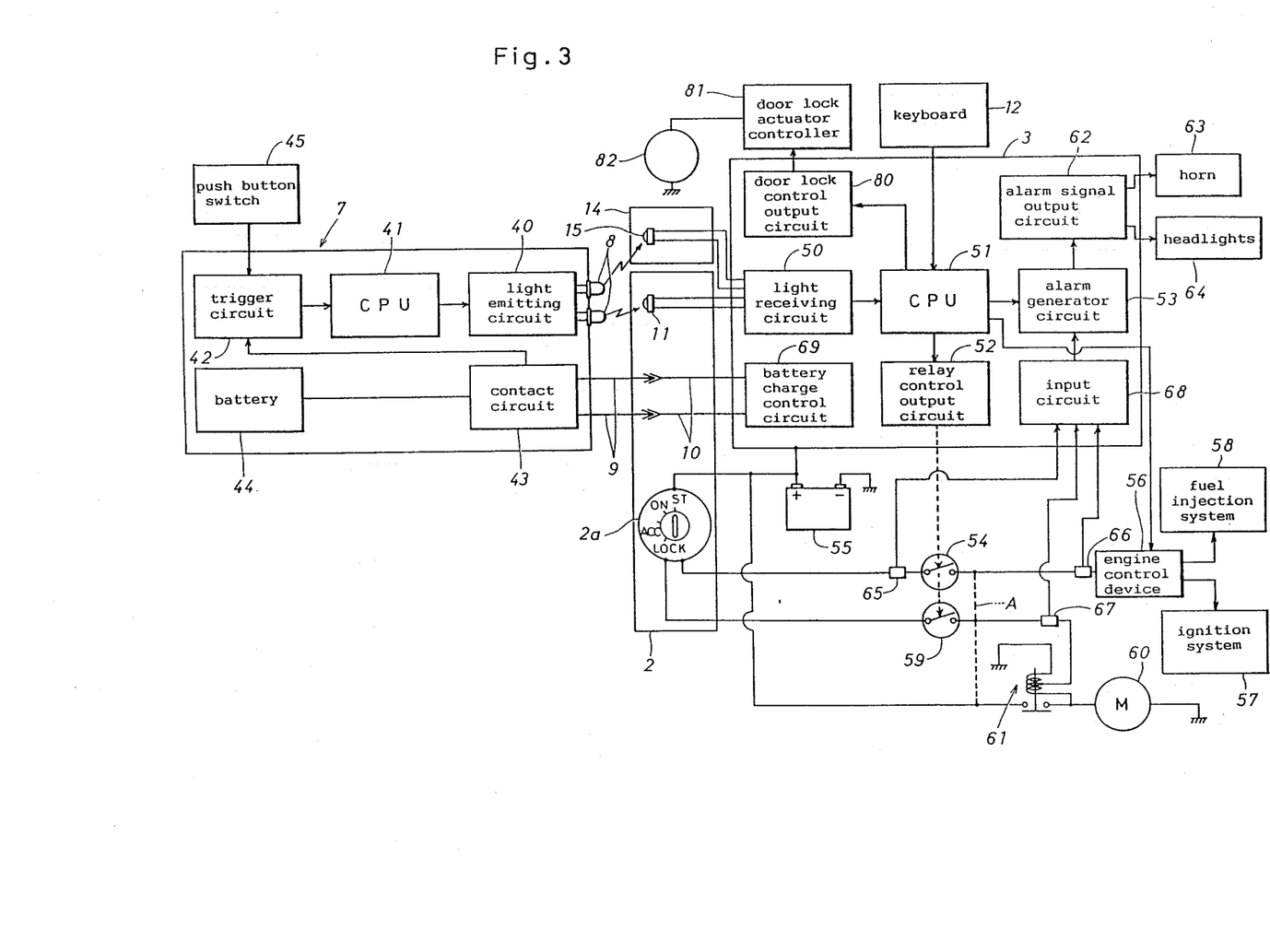
FIG. 3 is a block diagram representing the structure of the vehicular anti-theft system according to the present invention.

FIGS. 1 through 3 generally show the vehicular anti-theft system according to the present invention. This system comprises a key switch unit 2, which combines a steering lock and an ignition key switch 2a, mounted on the steering column of the vehicle 1, a control device 3 which controls the starting of the engine and the operation of the means for sounding an alarm, a keyboard 12 connected to this control device 3 and placed in the passenger compartment of the vehicle, a door lock actuator controller 81 connected to a light receiving unit 14, and a key device 4 having a key main body 5 for starting the engine by being inserted into the key switch unit 2.

The key device 4 comprises, in addition to the key main body 5, a handle 6 which incorporated a transmitter 7 therein. The handle 6 is provided with a pair of light emitting elements 8, for instance consisting of LED's, on either side of the base end of the key main body 5, with their axial lines directed towards the tip of the key main body 5. The side edges of the key main body 5 are provided with a pair of contact pieces 9.

The key switch 2a provided in the key switch unit 2 consists of a known cylinder lock which is adapted to receive the key main body 5 therein; and comprises a rotary switch which selectively forms circuits depending on the angular position of the key device 4, and contact pieces which can contact the previously mentioned contact pieces 9 when the key main body 5 is inserted therein. The key switch unit 2 is further provided with a light receiving element 11, consisting of a phototransistor, opposing one of the light emitting elements 8 of the key device 4 when the key main body 5 is inserted into the key switch unit 2. The contact pieces 10 and the light receiving elements 11 are connected to the control device 3 which was mentioned earlier.

FIG. 3 is a block diagram which schematically represents the structure of the vehicular anti-theft system according to the present invention.

The light emitting element 8 provided in the handle 6 of the key device 4 is connected to a light emitting circuit 40 which forms a part of the transmitter 7. The light emitting circuit 40 is connected to a CPU 41 which stores the code unique to the vehicle. The CPU 41 is also connected to a trigger circuit 42. To the trigger circuit 42 is connected a contact circuit 43 which is in turn connected to the contact pieces 9 and a rechargeable battery 44.

The control device 3 of the vehicle 1 is internally provided with a light receiving circuit 50 which is connected to the light receiving element 11, and the light receiving circuit 50 is further connected to a CPU 51 which stores a code identical to the previously mentioned unique code. The light receiving circuit 50 is also connected to a light receiving element 15 of the light receiving unit 14 which is placed adjacent to the door lock with its light receiving surface exposed to the outside. The CPU 51 is further connected to a door lock control output circuit 80 and an engine control output circuit 56. The door lock control output circuit 80 is connected to a door lock actuator controller 81 which controls an actuator 82 consisting of a reversible motor.

The CPU 51 is connected to the keyboard 12 having numerical keys as well as to a relay control output circuit 52 and an alarm generator circuit 53. The relay control output circuit 52 is connected to a main relay 54 for selectively supplying electric power from the on-board battery 55 to the engine control device 56, which controls the ignition system 57 and the fuel supply system 58 for the engine, as well as to a starter relay 59 which controls the starter motor 60 by way of a magnet switch 61. The alarm generator circuit 53 is connected to a horn 63 and headlights 64 by way of an alarm signal output circuit 61. To the alarm generator circuit 53 are further connected a sensor 65 which detects that the key switch 2a is at the position "ON", another sensor 66 which detects that electric power is being supplied to the engine control device 30, and yet another sensor 67 which detects that electric power is being supplied to the starter motor 60, by way of an input circuit 68.

As shown in FIG. 4, the relay control output circuit 52 is provided with a transistor T, a relay 81 and a diode D. The transistor T has its base connected to the CPU 51 and its emitter to the ground. The collector of the transistor T is connected to the contact piece 82 of the position "ON" of the key switch 2a serving as an ignition switch through the coil 81a of the relay 81 and to the anode of the diode D. The cathode of the diode D is connected to the node between the coil 54a of the main relay 54, whose other end is connected to the contact 82, and one of the ends of the contact set 81b of the relay 81, whose other end is grounded.

In the above described embodiment, the self retaining circuit acted upon the main relay which is interposed between the ignition switch and the engine control device, but it is also possible to provide a self retaining circuit according to the present invention to the output control circuit for various relay circuits in the cases where the relay circuits are provided between the on-board battery and various parts of the engine control device, such as the fuel supply system, the ignition system and so on, so as to be subjected to an on-off control.

A battery charge control circuit 69 associated with the on-board battery 55 is connected to the corresponding contact pieces 10 of the key switch unit 2 so that the battery 44 of the key device 4 be electrically charged by way of the contact circuit 43 when the corresponding contact pieces 10 are brought into contact with the contact pieces 9.

The key switch 2a selectively places its mechanical contact pieces to one of the positions of "LOCK", "ACC", "ON" and "ST". When the position "ON" is selected, the main relay 54 receives electric power from the on-board battery 55. When the key switch 2a is set to "ST" after passing the position "ON", electric power is supplied to both the main relay 54 and the starter relay 59.

The engine control circuit 56 permits the engine to be started by receiving electric power from the on-board battery 55 when the key switch 2a is set to the position "ON" and the main relay 54 is activated. And, the starter motor 60 receives electric power from the battery 55 through the magnet switch 61 when the key switch 2a is set to the position "ST" after passing the position "ON" and the starter motor relay 59 is turned on.

Figure 5:
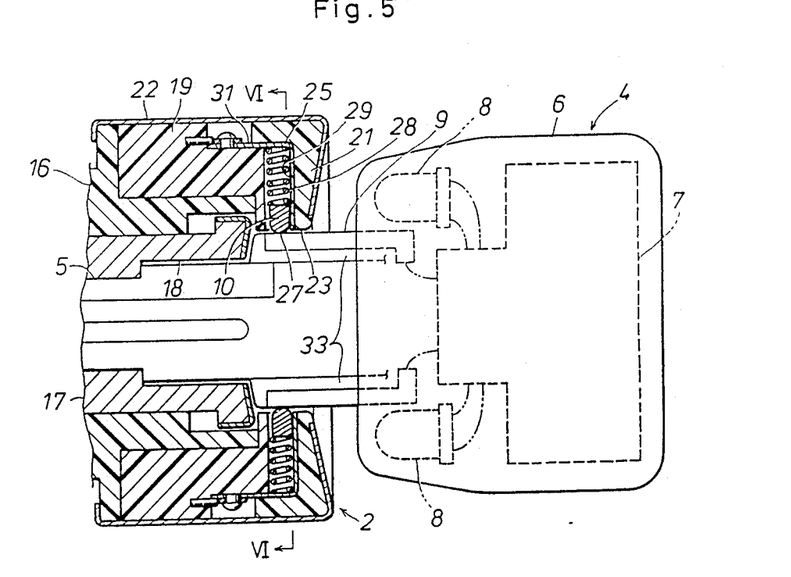
FIG. 5 is a longitudinal section view of the ignition key switch unit according to the present invention when the key device is inserted therein.
Figure 6:
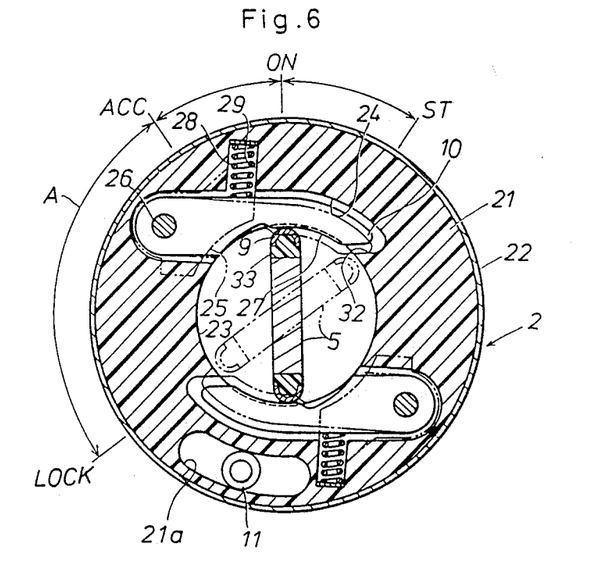
FIG. 6 is a sectional view taken along line VI—VI of FIG. 5.

FIGS. 5 and 6 show essential parts of the key device 4 and the key switch unit 2 when the key device received in the key switch 2a has been turned to a certain angular position.

As shown in FIG. 6, the key switch 2a may be turned to any of a plurality of positions "LOCK", "ACC", "ON" and "ST" for permitting the action of an engine control device 56 according to the selected position.

The key switch unit 2 is provided with a cylindrical outer sleeve member 16 made of synthetic resin material, and an inner sleeve member 17 which is received in the outer sleeve member 16, which is likewise made of synthetic resin material, in a rotatable manner over a certain angular range. The inner sleeve member 17 is provided with a key hole 18 for receiving the key main body 5.

A tubular inner cap 19 made of synthetic resin material is fitted onto the free end of the outer sleeve member 16 in a coaxial manner, and covers the peripheral portion of the axial end surface thereof. A similar auxiliary cap 21 is fitted over the inner cap 19. Further, a tubular outer cap 22 made of stamp formed sheet metal covers the axial end surface of the auxiliary cap 21 and surrounds the two caps 19 and 21 and the outer sleeve member 16 by being fixed to the outer sleeve member 16 by crimping.

The inner cap 19 and the auxiliary cap 21 are provided with a key introduction hole 21 as an extension of the key hole 18. The diameter of the key introduction hole 23 is substantially equal to the width of the base end of the key main body 5 and is slightly greater than the diameter of the key hole 18.

As best shown in FIG. 6, the auxiliary cap 21 is provided with cavities 24 which are open to the interface with the inner cap 21 as well as to the inner periphery of the hole 23, for receiving the corresponding contact pieces 10 therein. The cavities 24 further accommodate therein electro-conductive support plates 25 which are partly fixedly molded with the auxiliary cap 21. The support plates 25 are provided with upright pivot shafts 26 which pivotally support the base ends of the corresponding contact pieces 10; the radially inner surface of each of the contact pieces 10 adjacent to its free end is provided with an arcuate contact portion 27 which extends, in an arcuate manner, along the inner circumferential surface of the hole 23, from the position which is slightly away from the position "ON" towards the position "ACC", to the position corresponding to the position "ST".

To the edge of each of the corresponding contact pieces 10, opposite to the edge provided with the contact portion 27, elastically abuts a free end of a compression coil spring 28 which urges the corresponding contact piece 10 away from the outer periphery towards the center of the hole 23. Each of these compression coil springs 28 is received in a slot 29 formed in the radially outward direction from the corresponding cavity 24, along with a terminal portion 31 which forms a part of the corresponding support plate 25, and its base end is engaged to the terminal portion 31 which is bent perpendicularly towards the axial direction of the key switch unit 2. The terminal portions 31 are electrically connected to the control device 3 which is referred to earlier. The cavities 24 are provided with stopper portions 32 (FIG. 6) which limit the extent of the protrusion of the contact portions 27 into the hole 23.

Thus, when the key main body 5 is inserted into the key hole 18 of the key switch unit 2, the corresponding contact pieces 10 are electrically connected to the control device 3 by way of the compression coil springs 28 and the support plates 25.

As shown in FIG. 6, the key switch unit 2 is provided with a light receiving element 11 which faces axially outwardly from a slot 21a provided in the auxiliary cap 21 and an opening (not shown in the drawings) provided in the axial end surface of the outer cap 22 so as to conformally align with the slot 21a. This light receiving element 11 is so arranged that it can receive the light from one of the light emitting elements 8 of the key device 4 when the latter opposes the light receiving element 11 from a region located substantially between the positions "ACC" and "ST". The light emitting elements 8 are arranged in the key device 4 at positions which are symmetric with respect to the axial line, so as to allow the key device 4 to be properly inserted into the key hole 18 even when it is inverted.

A pair of terminal holders 33, having a semicircular cross section, are fixedly attached to either side edge of the base end of the key main body 5 so as to extend along the axial direction of the key main body 5; the terminal holders 33 are each covered by the corresponding contact piece 9 having an arcuate cross section and fixedly attached to the outer surface of the corresponding terminal holder 33.

Now the action of the above described vehicular anti-theft system is explained in the following with reference to FIG. 3.

First of all, when the door is about to be unlocked, the push button switch 45 provided in the handle 6 of the key device 4 is pressed by the user who is standing outside of the vehicle 1, and a signal confirming the closure of the contacts of the push button switch 45 is then supplied to the trigger circuit 42. According to the command from the trigger circuit 42, the CPU 41 produces the unique code signal, and an infrared pulse signal is transmitted from the light emitting circuit 40 and the light emitting elements 8 to the light receiving element 15 of the light receiving unit 14 provided adjacent to the door handle.

When this code signal is transferred from the light emitting element 15 to the CPU 51 through the light receiving circuit 50, the unique code is verified in the CPU 51.

When the unique code has been verified to be genuine, the door lock control output circuit 80 produces a drive signal to the door lock actuator controller 81. The door lock actuator controller 81 determines the current status of the door lock actuator 82, and supplies a command to the actuator 82 according to the current status. Thereby, the actuator 82 is activated and the door is locked or unlocked as the case may be.

When the key main body 5 is inserted into the key switch unit 2, and the contact pieces 9 and the corresponding contact pieces 10 are brought into contact with each other, a signal indicative of this contact is transmitted from the contact circuit 43 to the trigger circuit 42. According to the command from the trigger circuit 42, the CPU 41 produces a code signal, and an infrared code signal is transmitted from the light emitting circuit 40 and the light emitting elements 8 to the light receiving element 11. When this code signal is transmitted from the light receiving element 11 to the CPU 21 of the control device 3 by way of the light receiving circuit 50, the verification of the unique code is performed in the CPU 51.

When the key switch 2a is set to the position "ON" and the CPU 51 has sent a command to the relay control output circuit 52 upon detection of the agreement of the codes, the transistor T turns on the relay 81 and this causes the main relay 54 to be turned on and the engine control device 56 to be connected to the battery 55. Thereafter, even if the transistor T has changed from its turned-on condition to its turned-off condition, because of the presence of the diode D, the relay 81 is not deactivated and the main relay 54 can be maintained in its activated state. Thus, as long as the key switch 2a is at the position "ON", the engine control device 56 is maintained in its activated state.

Thus, the main relay 54 is kept in its turned-on state and the engine is kept running even when the process of electronic code matching is successfully performed only once in the initial stage and the transistor T ceases to be conductive thereafter. Also, if the transistor ceases to be conductive for other reasons such as a failure of the system, the relay 81 is kept activated without causing any interruption to the operation of the vehicle. Additionally, because the CPU 51 is provided with memory which retains the result of code matching for a certain range of the angular position with or without chronological conditions, even when the engine has stopped due to stalling, for instance, and is to be started all over again, the engine control device 56 is kept active and the engine can be started without requiring the verification of the code all over again.

In any case, as the key switch 2a passes the position "ON" and the mechanical contact pieces not shown in the drawings close, electric power is supplied to the engine control device 56 by way of the main relay 54. When the key switch 2a reaches the position "ST", electric power is supplied to the starter motor 60 by way of the starter relay 59 and the engine is started. The CPU 51 is provided with memory so that the result of the verification of the unique code continues to be valid and the normal operation of the vehicle 1 continues to be possible until the key switch 2a is returned to the position "ACC". When the key switch 2a has been returned to the position "ACC", it is detected by the sensor 65 and its output is supplied to the CPU 51 by way of the input circuit 68 and the result of verification of the unique code is invalidated. Here, it is also possible to keep the result of the verification of the code to be valid until the key switch 2a has been returned to the position "LOCK" or until the key device 4 has been removed from the key switch unit 2.

If the code signal is not transmitted to the CPU 51, for instance due to a failure in the key device 4, it is possible for the driver to enter a certain combination of numbers from the keyboard 12 to be converted into the unique code and to transmit it to the CPU 51. In this case, the CPU 51 is so programmed that if the correct combination of numbers is not entered from the keyboard 12 within a certain time period, which, for instance, may be 30 seconds, before and/or after the key main body 5 has been inserted into the key switch unit 2, the CPU 51 would not accept the inputting of the combination of numbers or, in other words, the unique code from the keyboard 51 so as to increase the security of the system.

When the code signal has been confirmed to be genuine, the relay control output circuit 52 is activated so as to turn on the main relay 54 and the starter relay 59. Thus, the supply of electric power from the on-board battery 55 to the engine control device 56 and the starter motor 60 is enabled. At the same time, an alarm prohibit signal is supplied to the alarm generator circuit 53, and when the key device 4 is turned so as to place the key switch 2a at the position "ST" after passing the position "ON", the engine is actually started. Thereafter, the vehicle 1 continues to be in normal operation until the key switch 2a is set to the position "ACC" or "LOCK". The alarm generator circuit 53 can readily produce an alarm when a signal is received from any of the sensors 65 through 67 when no alarm prohibit signal is produced from the CPU 51.

As an advantageous feature of the present invention, the memory of the CPU 51 may be provided with timer means. More specifically, when the correct combination of numbers is entered from the keyboard 12 or when the electronic code matching has been successfully performed, since the CPU 51 is programmed that the result of code verification continues to be valid, for instance, for 30 seconds after the key switch 2a is set to the position "LOCK" or, in other words, even after the engine stopped its operation by turning the key switch 2a to the position "LOCK" or "ACC", (or even when the key device is removed from the key switch unit 2,) as long as the engine is immediately started again, there is no need to enter the correct combination of numbers from the keyboard 12 or to achieve an electronic code matching all over again.

If the CPU 41 has not confirmed the agreement of the codes or, in other words, if either a code different from the unique code has been inputted or no code signal has been inputted from the key device 4 or the keyboard 12, the alarm generator circuit 53 is not deactivated and kept in its turned-on condition by absence of the alarm prohibit signal, and since the relay control output circuit 52 does not produce the command to turn on the two relays 54 and 59, the engine control device 56 and the starter motor 60 are both disabled. If the key switch 2a is turned to the position "ON" in this state, the horn 63 and the headlights 64 are activated to produce an alarm by the alarm generator circuit 53 receiving a signal from the sensor 65 by way of the input circuit 68.

When the key main body 5 is not inserted into the key switch unit 2 and the engine control circuit 56 and the starter motor 60 are directly connected to the battery 55 without the intervention of the relays 54 and 59 as shown by the broken line A in FIG. 3, the alarm is again produced by the alarm generator circuit 53 receiving a signal from the sensors 66 and 67 by way of the input circuit 68.

Therefore, when an attempt is made to start the vehicle 1 with a duplicated key having no circuit for transmitting the code signal, since electric power is not supplied to the engine control device 56 or to the starter motor 60, the engine cannot be started and the alarm is issued. Likewise, when an attempt is made to jump the wires so as to supply electric power directly to the engine control device 56 and the starter motor 60, again, the alarm is generated.

Also, by using a keyboard in combination with a transmitter and permitting the engine to be started when the electronic code supplied to the vehicle either from the keyboard or from the transmitter is verified, the electronic code can be entered from the keyboard even when the transmitter has become inoperable due to a failure or loss thereof, and the vehicle can be still operable.

Now, when the action related to the locking and unlocking of the door is considered, the user directs the light emitting portion of the transmitter (the key device 4 in this case) in the general direction of the light receiving element 15 of the light receiving unit 14. Therefore, it is not practical to require the user to direct the axial line of the emitted light accurately upon the light receiving element 15, and, therefore, the transmission of the signal cannot be readily accomplished unless the directivity of the signal has a certain width. In other words, it is desirable if the transmission of the signal is possible without requiring a precise operation.

Meanwhile, since the engine switch is activated by inserting the key main body 5 into the key hole 18, the light emitting elements 8 of the key device 4 and the light receiving element 11 of the key switch unit 2 are automatically located opposite to one another. If the trigger signal is to be produced according to the angular position of the key device, it is particularly desirable to permit the transmission of the signal to take place even when the speed of operating the key is high.

Considering these factors, according to the present invention, the pulse wave forms are made different from each other depending on whether the key is used to operate the door lock or the engine switch.

In other words, in the trigger circuit 42, it is determined whether the command is from the push button switch 45 or from the contact circuit 43, and whether the control which is about to be performed is the door lock operation or the ignition key operation. According to this information, the pulse signal is selectively produced so that an appropriate signal form is automatically produced so as to meet the condition for transmitting the signal.

Figure 10:
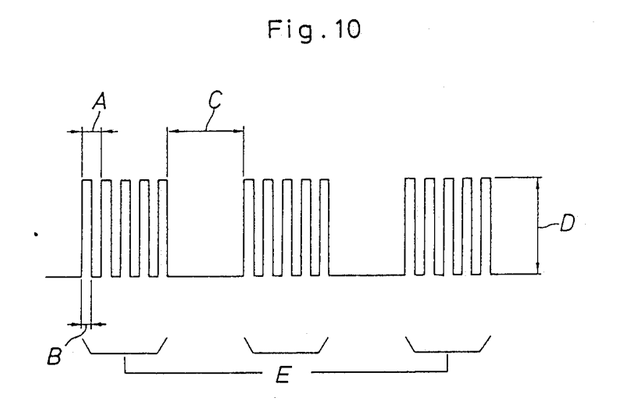
FIG. 10 is a wave form diagram representing a typical pattern of the pulse code signal produced from the transmitter according to the present invention.

As shown in FIG. 10, the basic factors of a pulse wave comprise (A) the intervals between code bits; (B) the pulse width; (C) the intervals between codes; (D) the height of the pulses; and (E) the number of code groups. By appropriately selecting these factors, a signal which meets the receiving sensitivity can be generated.

In the case of the ignition key operation, since the light emitting elements 8 and the light receiving element 11 are precisely opposed to each other, (D) the height of the pulses and (E) the number of code groups would not be of any significant importance. Rather, it is desirable to obtain a fast response so that the reading of the code by the light receiving element 11 may be accomplished in a shortest time possible while the key is being turned. In other words, in this case, it is preferred to reduce (B) the pulse width and (A) the intervals between code bits.

On the other hand, in the case of the door lock operation, since the distance between the light emitting elements 8 and the light receiving element 15 is indeterminate, the pulse height (D) should be increased so as to increase the signal output level. And, to the end of accomplishing the transmission of the signal even when the two elements are not precisely opposed to each other and increasing the chances of successful transmission of the signal, (C) the intervals between codes should be increased and (E) the number of code groups should be increased.

As an alternate design based on the above discussed concepts, since the supply of electric power is adequate when the key main body 5 is inserted in the key switch unit 2 and the internal battery 44 of the key device 4 is being electrically charged through the corresponding contacts 10 of the key switch unit 2 and the contacts 9 of the key device 4, the pulse width (B) or the pulse height (D) may be increased and the number of code groups (E) may be increased, so as to increase the probability of code verification. Conversely, when the door lock is to be operated on, since the key device 4 must entirely depend on its battery 44 for its operation and the supply of electric power thereto is not necessarily sufficient, the consumption of electric power may be reduced by reducing the pulse width (B) or the pulse height (D). However, in order to accomplish a reliable door lock operation, the interval between the code groups may have to be increased.

Thus, according to a certain aspect of the present invention, since the form of the pulse signal is varied depending on the condition of the signal transmission without modifying the common unique code, unnecessary consumption of electric power is prevented and the handling of the device is much improved.

Figure 7:
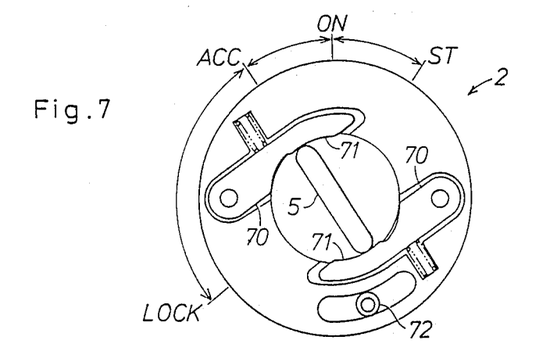
FIGS. 7 through 9 are views similar to FIG. 6, showing the second through fourth embodiments of the contact structure of the vehicular anti-theft system according to the present invention.

FIG. 7 is a schematic view similar to FIG. 6, illustrating the second embodiment of the present invention. The contact portions 71 of the corresponding contact pieces 70 are provided in such a manner that the contact portions 71 are in contact with the contact pieces 9 when the key switch 2a is anywhere between a position slightly preceding the position "ACC", or a position slightly removed from the position "ACC" towards the position "LOCK", and the position "ON", as the key switch 4 is turned from the position "LOCK" to the position "ON". The light receiving element 72 is placed at a part of the key switch unit 2 in such a manner that it faces either one of the light emitting elements 8 of the key device 4 over a range extending from the position "ACC" to the position "ON". In this case, memory is set up in the CPU 51 in such a manner that the result of the verification continues to be valid and the normal operation of the vehicle 1 continues to be possible until the key switch 2a is returned to the position "LOCK". Here, it is also possible to keep the result of the verification of the unique code valid until the key device 4 is removed from the key switch unit 2. Otherwise, this embodiment produces the same functions and effects as the first embodiment.

Figure 8:
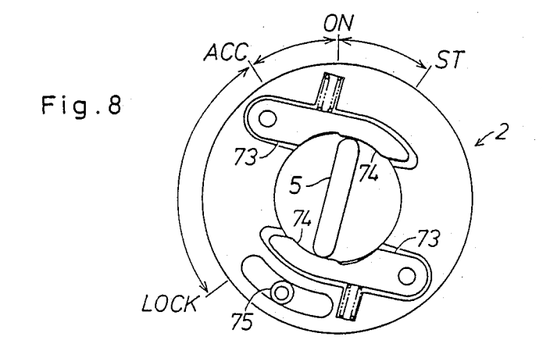

FIG. 8 is a schematic view similar to FIG. 6, illustrating the third embodiment of the present invention. The contact portions 74 of the corresponding contact pieces 73 are provided in such a manner that the contact portions 74 are in contact with the contact pieces 9 when the key switch 2a is located between a position slightly removed from the position "ON" toward the position "ST" and the position "ST", as the key switch 2a is turned from the position "ON" to the position "START". The light receiving element 75 is placed at a part of the key switch unit 2 in such a manner that it faces either one of the light emitting elements 8 of the key device 4 over a range extending from the position "ON" to the position "ST". In this case also, memory is set up in the CPU 51 in such a manner that the result of the verification continues to be valid and the normal operation of the vehicle 1 continues to be possible until the key switch 2a is returned to the position "ACC". Here, it is also possible to keep the result of the verification of the unique code valid until the key device 4 is returned to the position "LOCK" or, alternatively, until it is removed from the key switch unit 2. In this case, when the key switch 2a is at the position "ON", the corresponding contact pieces 73 are not connected to the battery charge control circuit 69 since the two contact piece sets are not in mutual contact. Otherwise, this embodiment produces the same functions and effects as the first embodiment.

Figure 9:
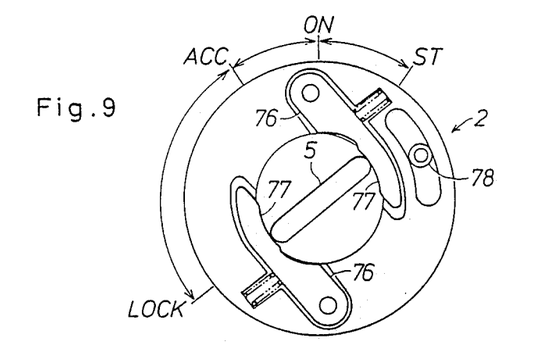

FIG. 9 is a schematic view similar to FIG. 6, illustrating the fourth embodiment of the present invention. The contact portions 77 of the corresponding contact pieces 76 are provided in such a manner that the contact portions 77 are in contact with the contact pieces 9 when the key main body 5 is inserted into the key switch unit 2. The light receiving element 72 is placed at a part of the key switch unit 2 in such a manner that it faces either one of the light emitting elements 8 of the key device 4 substantially at the position "LOCK". In this case, memory is set up in the CPU 51 in such a manner that the result of the verification continues to be valid and the normal operation of the vehicle 1 continues to be possible until the key main body 5 is removed. In this case also, in the same way as the third embodiment, when the key switch 2a is at the position "ON", the corresponding contact pieces 76 are not connected to the battery charge control circuit 69 since the two contact piece sets are not in mutual contact. Otherwise, this embodiment produces the same functions and effects as the first embodiment.

Thus, according to the present embodiment, since the time required to start the vehicle equipped with the anti-theft system which involves the verification of an electronic code can be reduced without impairing the performance of the anti-theft system, a substantial advantage can be obtained.

It is obvious that the present invention is not limited by the above described embodiments but may also be applied to other different embodiments. For instance, a transmitter and a keyboard were used in the above described embodiment, but it is also possible to use a keyboard alone as means for entering the electronic code. Further, in the above embodiment, electric power was supplied to the various circuits of the transmitter 7 from the battery 44 of the key device 4, but it is also possible to supply electric power from the on-board battery 55 to the transmitter 7 by inserting the key main body 5 into the key switch 2a and establishing an electric contact between them by way of the mutually cooperating contact pieces 9 and 10.

Further, the CPU 51 may be programmed in a different manner so that the vehicle 1 may be started with a mechanical key only but an alarm is issued unless a satisfactory matching of the electronic codes takes place with a certain chronological relation with the use of the mechanical key. This alternate embodiment may consist of the same hardware as the first embodiment which is illustrated in FIG. 3 but the CPU 51 is programmed in a different way.

According to this alternate embodiment, when the key main body 5 is inserted into the key hole 18 and the key switch unit 2 is turned to a certain angular position so as to perform the matching of the electronic codes, an alarm prohibit signal is transmitted from the CPU 51 to the alarm generator circuit 53. Irrespective of the result of the code matching, the engine can be actually started simply by turning the key switch 2a with the key device 4 to the position "ST" after passing through the position "ON". Thereafter, the normal operation of the vehicle continues to be possible until the key switch 2a is returned to the position "ACC" or "LOCK". The alarm generator circuit 53 always remains ready to produce an alarm when a signal is received from any of the sensors 65 through 67 when the alarm prohibit signal is not received from the CPU 51.

If the CPU 51 fails to confirm the agreement of the codes or, in other word, either if a code different from the unique code has been inputted or if no code signal has been inputted from the key device 4 or the keyboard 12, the alarm generator circuit 53 is not deactivated and kept in its turned-on condition. If the key switch 2a is turned to the position "ON" and no successful code verification ensues within a certain prescribed time period, the horn 63 and the headlights 64 are activated after the prescribed time period to produce an alarm by receiving a signal from the sensor 65 by way of the input circuit 68 and the engine is stopped.

Also, when no key is inserted into the key switch unit 2 and the engine control device 56 and the starter motor 60 are directly connected to the battery 55 without the intervention of the relays 54 and 59 as indicated by the broken line A in FIG. 3, the alarm is again produced by the signals from the sensors 66 and 67 being transmitted to the alarm generator circuit 53 by way of the input circuit 68 within the prescribed time period.

Thus, if an attempt is made to operate the vehicle 1 by using a duplicated key which is not equipped with a circuit for transmitting the said code signal, no electric power is supplied to the engine control device 56 or to the starter motor 60, and the starting of the engine is made impossible, accompanied by the continual sounding of the alarm. Also, when an attempt is made to operate the vehicle by directly supplying electric power to the engine control device 56 and the starter motor 60, the alarm is again sounded.

Figure 11:
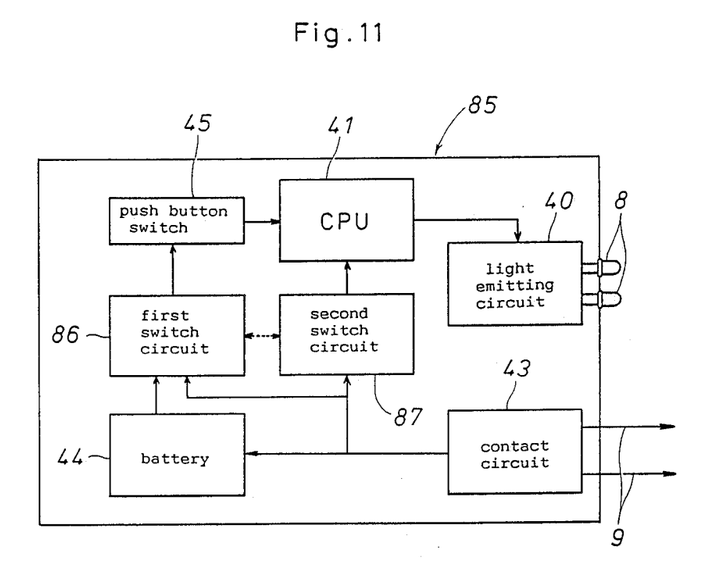
FIGS. 11 is a view similar to FIG. 3 showing another embodiment of the anti-theft system according to the present invention.

FIG. 11 shows a modified embodiment of the present invention. In FIG. 11, the parts corresponding to those of the preceding embodiment are denoted with like numerals and the description thereof is omitted. In this embodiment, The CPU 41 is connected to a first switch circuit 86 through the push button switch 45. The first switch circuit 86 is also connected to the rechargeable battery 44. The first switch circuit 86 is also connected to the contact circuit 43 which consists of a diode bridge circuit connected to the contact pieces 9. The first switch circuit 86 is turned on, only when the contact pieces 9 are not in contact with the corresponding contacts 10 of the key switch unit 2, so as to permit the operation of the push button switch 45. In other words, the push button switch 45 is disabled while the contacts 9 are in contact with the corresponding contacts 10.

The CPU 41 is also connected to a second switch circuit 87 which is in turn connected to the contact circuit 43. The second switch circuit 87 cooperates with the first switch circuit 86, and is turned on, only when the two sets of contacts 9 and 10 are in mutual contact, so as to supply a certain trigger signal to the CPU 41.

Thus, when the key main body 5 of the key device 4 is inserted into the ignition key switch unit 2, the contacts 9 come into contact with the corresponding contacts with the result that the first switch circuit 86 turns off, disabling the push button switch 45 while the second switch circuit 87 turns on. The second switch circuit 87 then supplies a certain trigger signal to the CPU 41. The CPU 41 then produces the unique code, and the code signal is transmitted from the light emitting circuit 40 and the light emitting elements 8 to the light receiving element 11.

The CPU 41 is programmed in such a manner as to suspend the transmission of the code signal after transmitting the code signal for a prescribed number of times according to the trigger signal from the second switch circuit 87. The transmission of the code signal is not resumed until the key main body 5 is inserted therein again after being removed from the ignition key switch unit 2. Further, since the first switch circuit 86 is turned off while the second switch circuit 87 is turned on during the time the two sets of contacts 9 and 10 are in mutual contact, the operation of the push-button switch 45 is disabled and the supply of electric power to the transmitter 7 is made from the on-board battery 55. Therefore, the electric power from the battery 44 is not consumed while it is being electrically charged.

Thus, according to the present invention, since no electric power from the power source of the transmitter is wasted while the power source is being electrically charged, the transmitter can operate at all times without fail.

Figure 12:
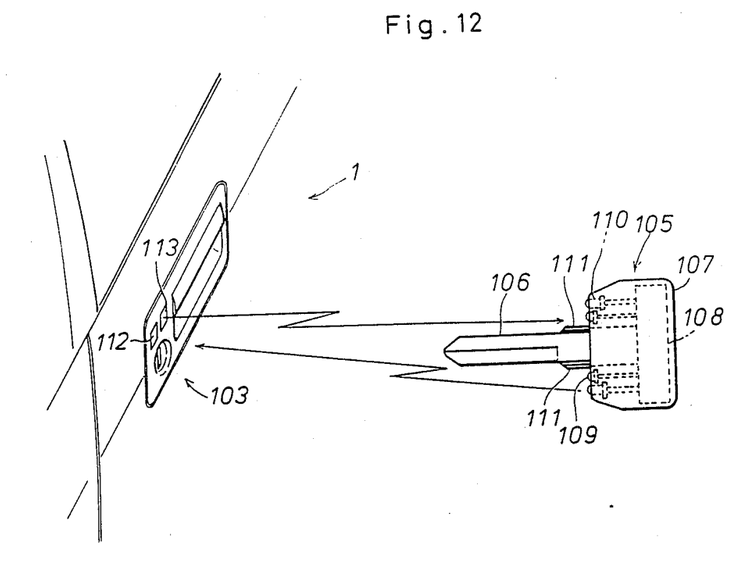
FIGS. 12 and 13 are illustrative views showing the structures of the key switch and the key device according to yet another embodiment of the anti-theft system of the present invention.
Figure 13:
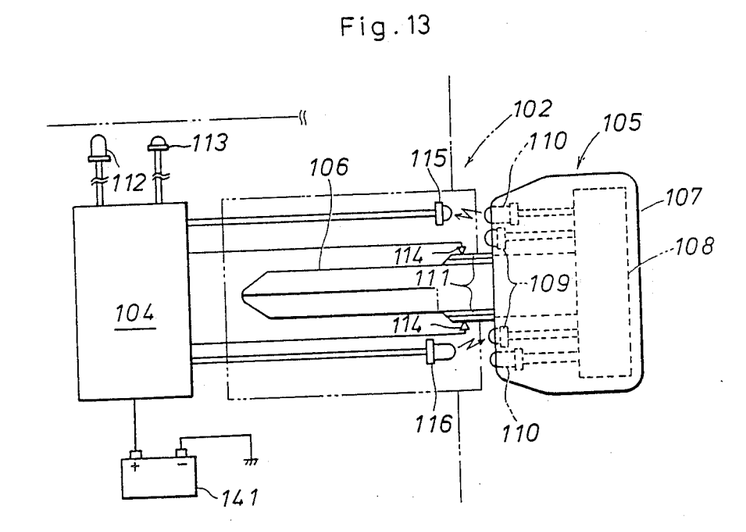
Figure 14:
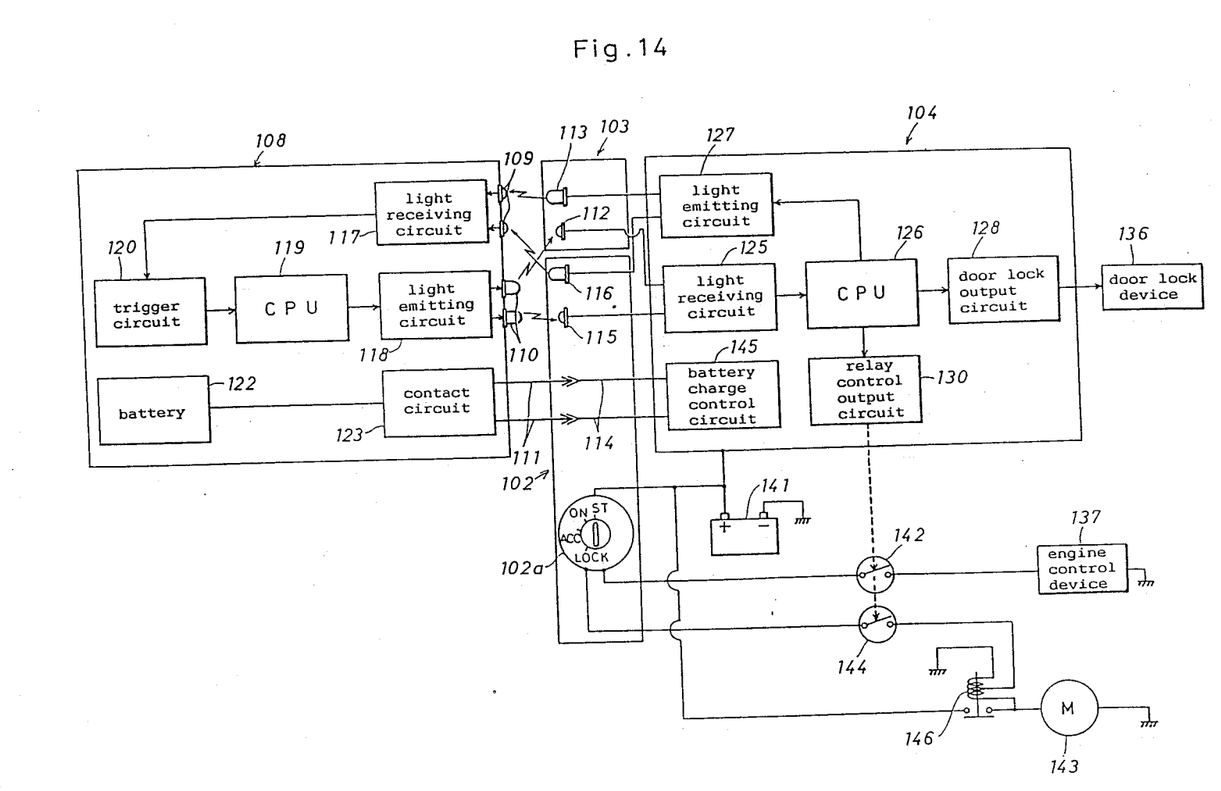
FIGS. 14 is a view similar to FIG. 3 corresponding to the embodiment given in FIGS. 12 and 13.

FIGS. 12 through 14 show yet another embodiment of the vehicular anti-theft device according to the present invention, This device comprises a key switch unit 102 provided with an ignition key switch 102a which is mounted on the steering column of the vehicle 1 and serves also as a steering lock, a door key switch 103 provided in the door handle of the door of the vehicle 1, a control device 104 for controlling the locking unlocking of the door lock and the starting of the engine, and a key device 105 which locks and unlocks the door lock by acting upon the door key switch 103 and starts the engine by being inserted into the ignition key switch 102.

The key device 105 consists of a key main body 106 and a handle 107; the handle 107 incorporates a transmitter 108 therein. The parts of the key handle 107 which interpose the base end of the key main body 106 therebetween are each provided with a light receiving element 109 consisting of a phototransistor and a light emitting element 110 consisting of an LED, with their axial lines directed towards the tip of the key main body 106. The side edges of the key main body 106 are provided with a pair of contacts 111.

As shown in FIG. 12, the door key switch 103 of the vehicle 1 is adapted to lock and unlock the door by inserting the key main body 106 into its key cylinder and turning the key device 105 or, alternatively, by remote control as described hereinafter. A light receiving element 112 and a light emitting element 113 are provided adjacent to the key cylinder, and are connected to the control device 4.

As shown in FIG. 13, the ignition key switch unit 102 is adapted to receive the key main body 106 therein, and is internally provided with mechanical contacts which close depending on the angular position of the key device 105 and a pair of corresponding contacts 114 which can contact the previously mentioned contacts 111. The key switch unit 102 is provided with a light receiving element 115 disposed opposite to one of the light emitting elements 11O of the key device 105 when it is inserted into the ignition key switch unit 102 and a light emitting element 116 consisting of an LED which is placed so as to diagonally oppose the light receiving element 115 with respect to the key hole. The corresponding contacts 114, the light receiving element 115 and the light emitting element 116 are connected to the control device 104.

FIG. 14 is a block diagram which schematically represents the structure of the vehicular anti-theft device according to the present embodiment illustrated in FIGS. 12 and 13.

The light receiving element 109 provided in the handle 107 of the key device IO5 is connected to a light receiving circuit 117 of the transmitter 108 which is in turn connected to a trigger circuit 120. The light emitting element 110 is connected to a light emitting circuit 118 which is in turn connected to a CPU 119 provided with memory for storing a code unique to the vehicle. The trigger circuit 120 is also connected to the CPU 119. The contacts 111 are connected a contact circuit 123 which is in turn connected to a rechargeable battery 122.

The control device 104 provided on the vehicle 1 is internally provided with a light receiving circuit 125 connected to the light receiving element 112 of the door key switch 103 and the light receiving element 115 of the key switch unit 102; the light receiving circuit 125 is connected to a CPU 126 having memory for storing a code which matches with the code unique to the vehicle. The CPU 126 is also connected to a light emitting circuit 127 which is in turn connected to the light emitting element 113 of the door key switch 103 and the light receiving element 116 of the key switch unit 102. The CPU 126 is further connected to a door lock output circuit 128 and a relay control output circuit 136; the door lock output circuit 128 is connected to a door lock device 136 for locking and unlocking the door while the relay control output circuit 130 is connected to a main relay 142 for selectively supplying electric power from the on-board battery 141 to an engine control device 137, which is functionally connected to the ignition system and the fuel injection system of the vehicle, as well as to a starter relay 144 which controls the starter motor 143.

The battery charge control circuit 145 provided in the control device 104 is connected to the on-board battery 141. The battery charge control circuit 145 is connected to the corresponding contacts 114 of the ignition key switch 102a in such a manner that the battery 122 may be charged through the contact circuit 123 when the contacts 114 come into contact with the contacts 111.

The ignition key switch 102a selectively places its mechanical contacts to one of the positions of "LOCK", "ACC", "ON" and "ST". When the position "ON" is selected, the main relay 142 receives electric power from the on-board batter 141. When the ignition key switch 102a is set to "ST", electric power is supplied to both the main relay 142 and the starter relay 144.

Now the action of the above described vehicular anti-theft deice is explained in the following.

The light emitting element 113 of the door key switch 103 of the vehicle 1 transmits a trigger signal at a certain interval. When the key device 105 is directed toward the door key switch 110, the trigger signal is received by the light receiving element 109 of the key device IO5 and is then supplied to the trigger circuit 120 through the light receiving circuit 117. The CPU 119 generates the unique code signal according to the command from the trigger circuit 120, and transmits the infrared code signal toward the light receiving element 112 through the light emitting circuit 118 and the light emitting element 110. In this connection, the handle 107 may be provided with an 10 auxiliary push button switch for the trigger circuit 120 on its surface so that the code signal may be transmitted by pressing this push button switch.

The code signal received by the light receiving element 112 is supplied to the CPU 126 through the light receiving circuit 125 in the control device 104, and is verified by the CPU 126. If the code signal is verified to match with the internal code, the door lock device 136 is activated by the door lock output circuit 128 to lock or unlock the door lock as the case may be.

In the key switch unit 102, the trigger signal is transmitted from the light emitting element 116 when the ignition switch 102a is set to one of the various positions, for instance to the position "ACC". When the key main body 6 of the key device 105 is inserted into the ignition key switch unit 102 and turned to the above mentioned position, the trigger signal is transmitted from the light emitting element 116; this trigger signal is received by the light receiving element 109 of the key device 105 and is supplied to the trigger circuit 120 through the light receiving circuit 117. The CPU 119 then produces the unique code signal according to the command from the trigger circuit 120 and supplies it to the light receiving element 115 through the light emitting circuit 118 and the light emitting element 110. Alternatively, the inserting the key main body 106 into the ignition key switch unit 102 may cause the light emitting element 116 to transmit the trigger signal.

When the light receiving element 115 receives the code signal, the received signal is supplied to the CPU 126 through the light receiving circuit 125 for the verification of the unique code. When the code is verified, the relay output circuit 130 turns on the main relay 142 and the starter relay 144. When the ignition switch has been turned to the position "ST" after passing through the position "ON", the engine control device 137 activates the ignition system and the fuel injection system of the engine, and the engine is started at the position "ST" where the starter motor is activated through a magnet switch 146.

On the other hand, when the codes do not match up at the CPU 126 or, in other words, if a wrong code has been inputted or no code has been inputted from the key device 105, the engine would not start without the main relay 142 and the starter relay 144 being activated.

Thus, if an attempt is made to operate the vehicle without any successful code matching, the engine would not start and the vehicle is prevented from being stolen.

Thus, according to this embodiment, the key device is extremely simple to use because the equipment to be protected from theft is enabled simply by directing the key device thereto. Further, by thus increasing the complexity of the code matching, the anti-theft protection of the vehicle is much improved.

What we claim is:

1. A vehicular anti-theft system for a vehicle, comprising:
    a key switch turnable with a matching key between a first position suitable for receiving said key therein and corresponding to an inoperative state of the vehicle, and a second position corresponding to an operative state of said vehicle;
    electronic code matching means for detecting an electronic code signal transmitted from a transmitter incorporated in said key;
    control means for enabling said vehicle when said key switch is turned with said matching key to said second position and said electronic code matching means has detected a matching code signal from said transmitter; and
    trigger means for acting upon said control means so as to detect said matching code signal transmitted from said transmitter;
    wherein said trigger means is activated when the position of said key switch is between a third position, which is between said first position and said second position, and a fourth position, which is between said third position and said second position.

2. A vehicular anti-theft system as defined in claim 1, wherein said key switch and said key are provided with contact means which establish an electric contact therebetween when said key is inserted into said key switch at said first position, said trigger means being activated when said electric contact is established.

3. A vehicular anti-theft system as defined in claim 1, wherein said key switch and said key comprise contact means for establishing an electric contact therebetween when said key switch is located between said third and fourth positions, said trigger means being activated when said electric contact is established.

4. A vehicular anti-theft system as defined in claim 1, wherein said control means is provided with memory means which permits said vehicle to be enabled when said key switch is turned with said matching key to said second position without involving the process of detecting said matching code signal by said code matching means, for a certain time interval after said code matching means has detected said matching electronic code.

5. A vehicular anti-theft system as defined in claim 1, wherein said control means is provided with memory means which permits said vehicle to be enabled when said key switch is turned with said matching key to said second angular position without involving the process of detecting said matching code signal by said code matching means, as long as said key is no longer kept inserted in said key switch after said code matching means has detected said matching electronic code.

6. A vehicular anti-theft system as defined in claim 1, wherein said control means is provided with memory means which permits said vehicle to be enabled when said key switch is turned with said matching key to said second angular position without involving the process of detecting said matching code signal by said code matching means, as long as said key switch is no longer kept within a certain range of its position after said code matching means has detected said matching electronic code.

7. A vehicular anti-theft system as defined in claim 1, wherein said control means comprises a self retaining circuit which maintains said enabled state of said vehicle once said vehicle is enabled.

8. A vehicular anti-theft system comprising:
a key switch turnable with a matching key between a first position suitable for receiving said key therein and corresponding to an inoperative state of the vehicle, and a second position corresponding to an operative state of said vehicle;
electronic code matching means for detecting an electronic code signal transmitted for a transmitter incorporated in said key;
control means for enabling said vehicle when said key switch is turned with said key to said second position and said electronic code matching means has detected a matching code signal from said transmitter; and
trigger means for acting upon said control means so as to detect said matching code signal transmitted from said transmitter;
wherein said trigger means is activated when the position of said key switch is between a third position, which is between said first position and said second position, and a fourth position, which is between said third position and said second position;
wherein said key switch and said key comprises means for signal transmitting and means for signal receiving respectively, said trigger means being activated when said signal receiving means receives a certain signal from said signal transmitting means.

9. A vehicular anti-theft system comprising:
a key switch turnable with a matching key between a first position suitable for receiving said key therein and corresponding to an inoperative state of the vehicle, and a second position corresponding to an operative state of said vehicle;
electronic code matching means for detecting an electronic code signal transmitted from a transmitter incorporated in said key;
control means for enabling said vehicle when said key switch is turned with said key to said second position and said electronic code matching means has detected a matching code signal from said transmitter; and
trigger means for acting upon said control means so as to detect said matching code signal transmitted from said transmitter;
wherein said trigger means is activated when the position of said key switch is between a third position, which is between said first position and said second position, and a fourth position, which is between said third position and said second position;
wherein said transmitter comprises a switch an operation of which causes said transmitter to activate onboard equipment, said transmitter producing two distinct code signals depending on whether said transmitter is activated by said trigger means or by said switch.

10. A vehicular anti-theft system as defined in claim 9, wherein said on-board equipment comprises a vehicle door lock, and the code signal for activating said vehicle door lock is of a different time duration than the code signal for enabling said vehicle.

11. A vehicular anti-theft system comprising:
a key switch turnable with a matching key between a first position suitable for receiving said key therein and corresponding to an inoperative state of the vehicle, and a second position corresponding to an operative state of said vehicle;
electronic code matching means for detecting an electronic code signal transmitted from a transmitter incorporated in said key;
control means for enabling said vehicle when said key switch is turned with said key to said second position and said electronic code matching means has detected a matching code signal from said transmitter; and
trigger means for acting upon said control means so as to detect said matching code signal transmitted from said transmitter;
wherein said trigger means is activated when the position of said key switch is between a third position, which is between said first position and said second position, and a fourth position, which is between said third position and said second position;
further comprising keyboard means for entering a code therefrom into said control means, the entering of said code acting upon said control means to enable said vehicle by turning said key switch with said key to said second position.

12. A vehicular anti-theft system as defined in claim 11, wherein the vehicle is enabled by entering of said code from said keyboard mans when said key switch is turned with said key to said second position at a certain time relative to the time at which said code is entered from said keyboard means.

13. A vehicular anti-theft system comprising:
a key switch turnable with a matching key between a first position suitable for receiving said key therein and corresponding to an inoperative state of the vehicle, and a second position corresponding to an operative state of said vehicle;
electronic code matching means for detecting an electronic code signal transmitted from a transmitter incorporated in said key;
control means for enabling said vehicle when said key switch is turned with said key to said second position and said electronic code matching means has detected a matching code signal from said transmitter; and trigger means for acting upon said control means so as to detect said matching code signal transmitted from said transmitter;

wherein said trigger means is activated when the position of said key switch is between a third position, which is between said first position and said second position, and a fourth position, which is between said third position and said second position;

wherein said key comprises a rechargeable battery for supplying electric power to said transmitter, a switch for activating said transmitter, and first contact means for connecting to said rechargeable battery; and said key switch comprises second contact means for establishing an electric contact with said first contact means of said key when said key is inserted into said key switch, said control means disabling the activation of said transmitter by means of said switch when said rechargeable battery receives electric power via said first contact means.

14. A vehicular anti-theft system for a vehicle comprising:

a key switch turnable with a matching key between a first position suitable for receiving said key therein and corresponding to an inoperative state of the vehicle and a second position corresponding to an operative state of said vehicle;

electronic code matching means for receiving an electronic code signal from a transmitter incorporated in said key only at a time during and after turning of said key; and control means for enabling said vehicle when said key switch is turned with said key to said second position and for disabling said vehicle when said electronic code matching means has failed to receive a matching code signal from said transmitter after said vehicle has been enabled.

15. A vehicular anti-theft system for a vehicle comprising:

a key switch turnable with a matching key between a first position suitable for receiving said key therein and corresponding to an inoperative state of the vehicle and a second position corresponding to an operative state of said vehicle;

electronic code matching means for detecting an electronic code signal transmitted from a transmitter which is incorporated in a part of said key; and control means for enabling said vehicle when said key switch is turned with said matching key to said second position and for issuing a warning when said electronic code matching means has failed to receive a matching code signal from said transmitter.

* * * * *